United States Patent
Lavery et al.

(10) Patent No.: US 12,499,307 B2
(45) Date of Patent: *Dec. 16, 2025

(54) AUTONOMOUS SPREADSHEET CREATION

(71) Applicant: Google LLC, Mountain View, CA (US)

(72) Inventors: Andrew J. Lavery, Austin, TX (US);
Earl J. Wagner, Chicago, IL (US);
Matthew Albright, Montclair, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,549

(22) Filed: Jun. 3, 2024

(65) Prior Publication Data
US 2024/0330576 A1    Oct. 3, 2024

Related U.S. Application Data

(63) Continuation of application No. 17/485,028, filed on Sep. 24, 2021, now Pat. No. 12,001,783.

(51) Int. Cl.
*G06F 40/18*    (2020.01)
*G06F 16/953*   (2019.01)
*G06F 40/40*    (2020.01)
*G06N 5/02*     (2023.01)

(52) U.S. Cl.
CPC ............ *G06F 40/18* (2020.01); *G06F 16/953* (2019.01); *G06F 40/40* (2020.01); *G06N 5/02* (2013.01)

(58) Field of Classification Search
None
See application file for complete search history.

(56) References Cited

U.S. PATENT DOCUMENTS

| | | | |
|---|---|---|---|
| 5,926,822 A | 7/1999 | Garman | |
| 7,613,719 B2 | 11/2009 | Chang et al. | |
| 8,972,437 B2 | 3/2015 | Hoellwarth | |
| 9,652,446 B2 | 5/2017 | Creason et al. | |

(Continued)

FOREIGN PATENT DOCUMENTS

| | | | |
|---|---|---|---|
| CN | 103473234 A | 12/2013 | |
| CN | 105531706 A | 4/2016 | |

(Continued)

OTHER PUBLICATIONS

International Search Report and Written Opinion for Application No. PCT/US2022/044611, mailed on Jan. 17, 2023, 11 pages.

(Continued)

*Primary Examiner* — Howard Cortes
(74) *Attorney, Agent, or Firm* — Lowenstein Sandler LLP

(57) ABSTRACT

A method includes receiving, by a processing device, a natural language query corresponding to a request to create a document having a tabular structure, identifying, by the processing device, one or more attribute categories pertaining to the document, converting, by the processing device, the natural language query into a data access query for accessing at least one external data source, retrieving, by the processing device from the at least one external data source, a plurality of data items corresponding to the one or more attribute categories, and generating, by the processing device, the document by populating each cell of a plurality of cells of the document with a respective data item of the plurality of data items.

20 Claims, 5 Drawing Sheets

(56) References Cited

U.S. PATENT DOCUMENTS

| | | |
|---|---|---|
| 9,870,354 B2 | 1/2018 | Hicks et al. |
| 10,120,851 B2 | 11/2018 | Naor |
| 10,180,979 B2 | 1/2019 | Perlegos |
| 10,698,978 B1 | 6/2020 | Hatton |
| 10,740,367 B2 | 8/2020 | Taylor et al. |
| 10,936,688 B2 | 3/2021 | Lu et al. |
| 11,182,538 B2 | 11/2021 | Ben-Ishay et al. |
| 11,222,171 B2 | 1/2022 | Zhang et al. |
| 11,550,778 B2 | 1/2023 | Zarras |
| 2012/0173476 A1 | 7/2012 | Rizvi |
| 2013/0159832 A1 | 6/2013 | Ingargiola et al. |
| 2015/0019216 A1 | 1/2015 | Singh et al. |
| 2015/0261794 A1 | 9/2015 | Lehrian et al. |
| 2015/0310073 A1 | 10/2015 | Chakrabarti et al. |
| 2016/0110367 A1 | 4/2016 | Krishnan |
| 2016/0179940 A1 | 6/2016 | Ashtiani et al. |
| 2017/0060868 A1 | 3/2017 | Rais Ghasem et al. |
| 2017/0308571 A1 | 10/2017 | McCurley et al. |
| 2017/0337233 A1 | 11/2017 | Fawcett et al. |
| 2018/0004722 A1 | 1/2018 | Naor |
| 2018/0108092 A1 | 4/2018 | Goodyear et al. |
| 2018/0203924 A1 | 7/2018 | Agrawal et al. |
| 2018/0239748 A1 | 8/2018 | Zhang et al. |
| 2018/0349377 A1 | 12/2018 | Verma et al. |
| 2019/0012305 A1 | 1/2019 | Dvorak |
| 2019/0340240 A1 | 11/2019 | Duta |
| 2020/0097541 A1* | 3/2020 | Christianson ....... G06F 16/3323 |
| 2020/0117758 A1 | 4/2020 | Lu et al. |
| 2021/0042308 A1 | 2/2021 | Mustafi |
| 2021/0081405 A1 | 3/2021 | Zarras |
| 2021/0103694 A1 | 4/2021 | Bouton |
| 2021/0141820 A1 | 5/2021 | Vora et al. |
| 2021/0173829 A1 | 6/2021 | Zeng et al. |
| 2021/0200761 A1 | 7/2021 | Li et al. |
| 2021/0271697 A1 | 9/2021 | Agrawal et al. |
| 2022/0035802 A1* | 2/2022 | Penzo ................... G06F 3/0481 |
| 2022/0044134 A1 | 2/2022 | Joy et al. |
| 2022/0058191 A1 | 2/2022 | Chen et al. |
| 2022/0067281 A1 | 3/2022 | Hu et al. |
| 2022/0309106 A1* | 9/2022 | Ramos ............. G06F 16/90332 |
| 2022/0335943 A1 | 10/2022 | Zhao |

FOREIGN PATENT DOCUMENTS

| | | |
|---|---|---|
| CN | 105824872 A | 8/2016 |
| CN | 108628887 A | 10/2018 |
| CN | 109829085 A | 5/2019 |
| CN | 110705226 A | 1/2020 |
| CN | 112417836 A | 2/2021 |
| CN | 112800773 A | 5/2021 |
| CN | 118159960 A | 6/2024 |
| JP | H11212996 A | 8/1999 |
| JP | 2003228564 A | 8/2003 |
| JP | 2007328716 A | 12/2007 |
| JP | 2012123559 A | 6/2012 |
| JP | 2019109782 A | 7/2019 |
| JP | 2021501386 A | 1/2021 |
| WO | 2015009586 A2 | 1/2015 |
| WO | 2021134358 A1 | 7/2021 |

OTHER PUBLICATIONS

International Search Report and Written Opinion for Application No. PCT/US2022/044613, mailed on Dec. 15, 2022, 17 pages.

International Search Report and Written Opinion for Application No. PCT/US2022/044614, mailed on Dec. 8, 2022, 13 pages.

Microsoft: "Data Refresh in Power BI," Jun. 3, 2021, 31 Pages, Retrieved from URL: https://docs.microsoft.com/en-us/power-bi/connect-data/refresh-data.

Microsoft: "Refresh an External Data Connection in Excel," Jun. 2, 2021, 4 Pages, Retrieved from URL: https://supportmicrosoft.com/en-us/office/refresh-an-external-data-connection-in-excel-1524175f-777a-48fc-8fc7-)8514b984440#:text=Click%20a%20cell%20in%20therminutes%20between%20each%20refresh%20operation.

Synapse: "Novel Deep Learning Powered Text Analytics," VYASA, Synapse, Jun. 2, 2021, 13 Pages, Retrieved from URL: https://vyasa.com/solutions/synapse/.

Xia S., et al., "KTabulator: Interactive Ad Hoc Table Creation Using Knowledge Graphs," Proceedings of the 36th Annual ACM Symposium on Applied Computing, 2021, 14 Pages.

Office Action for Chinese Patent Application No. 202280071445.1, mailed Nov. 30, 2024, 20 Pages.

Office Action for Chinese Patent Application No. 202280071451.7, mailed Dec. 5, 2024, 15 Pages.

Office Action for Japanese Patent Application No. 2024518729, mailed Feb. 25, 2025, 3 Pages.

Office Action for Korean Patent Application No. 10-2024-7012705, mailed Jul. 22, 2024, 15 Pages.

Office Action for Korean Patent Application No. 20247012705, mailed Jan. 23, 2025, 4 Pages.

Office Action of European Patent Application No. 22792996.5, mailed Mar. 7, 2025, 03 Pages.

Notice of Allowance for Korean Patent Application No. 10-2024-7012704, mailed May 30, 2025, 4 Pages.

Office Action for Indian Patent Application No. 202447031718, mailed Jul. 3, 2025, 07 Pages.

Office Action for Japanese Patent Application No. JP2024518729, mailed Jun. 17, 2025, 06 Pages.

* cited by examiner

| | A | B | C | D | E |
|---|---|---|---|---|---|
| 1 | Coach | Wins | Losses | Win Percentage | Seasons |
| 2 | John Doe | 1132 | 344 | 76.7 | 44 |
| 3 | Jane Smith | 946 | 385 | 71.1 | 43 |
| 4 | ... | ... | ... | ... | ... |

Retrieve one or more additional data items from at least one external data source for integration into a document having a tabular structure  410

Update the document based on the one or more additional data items  420

Receive a number of natural language queries from a user  510

Determine that the natural language queries are associated with a similar topic  520

Send a recommendation to the user to create a document having a tabular structure based on the natural language queries  530

Receive, from the user, an indication to create the document  540

Generate the document  550

FIG. 5

AUTONOMOUS SPREADSHEET CREATION

RELATED APPLICATIONS

This continuation application claims priority to U.S. patent application Ser. No. 17/485,028 filed on Sep. 24, 2021 and entitled "AUTONOMOUS SPREADSHEET CREATION," which is incorporated by reference herein.

TECHNICAL FIELD

Aspects and implementations of the present disclosure relate generally to electronic documents, and more particularly relate to autonomous creation of electronic documents having a tabular structure.

BACKGROUND

An electronic document ("document") can have a tabular structure including a plurality of cells. Such a document can be referred to as a "data table," or simply "table." Each cell corresponds to a region for inputting data in a particular form (e.g. numerical or text data), and the document can be used to organize, analyze and/or store the input data. Each cell can include a non-numerical data entry, a mathematical expression for assigning a value to the cell, or can remain empty. A mathematical expression can include a numerical value, a reference to a value of one or more cells within the spreadsheet, an arithmetic operator, a relational operator, a function, etc. Additionally, the document can support programming capability. For example, content of a cell can be derived from content of one or more other cells of the document. In some implementations, the document can be a spreadsheet. The cells within the spreadsheet can be arranged as an array including a number of rows and a number of columns, where a particular cell of the spreadsheet can be addressed or referenced with respect to its column location within the table and its row location within the table. In some examples, columns can be represented by letters (e.g., Column A, Column B, . . . ) and rows can be represented by numbers (e.g., Row 1, Row 2, . . . ). For example, a cell located in Column D and Row 5 can be referenced as cell D5.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed. In an implementation, a system includes a memory device and a processing device coupled to the memory device. The processing device is to perform operations including receiving a natural language query corresponding to a request to create a document having a tabular structure, identifying one or more attribute categories pertaining to the document, converting the natural language query into a data access query for accessing at least one external data source, retrieving, from the at least one external data source, a plurality of data items corresponding to the one or more attribute categories, and generating the document by populating each cell of a plurality of cells of the document with a respective data item of the plurality of data items.

In some implementations, the one or more attribute categories include a primary attribute category corresponding to one or more cells populated with one or more primary attributes and a secondary attribute category corresponding to one or more cells populated with one or more secondary attributes.

In some implementations, the at least one external data source includes at least one of: a knowledge graph or a website.

In some implementations, generating the personalized document includes generating the personalized document to have a size determined in accordance with a size limit.

In some implementations, the method further includes retrieving, by the processing device, one or more additional data items from the at least one external data source, and updating, by the processing device, the document based on the one or more additional data items. In some implementations, retrieving the one or more additional data items further includes receiving an additional natural language query, and retrieving the one or more additional data items in response to receiving the additional natural language query. In some implementations, retrieving the one or more additional data items further includes identifying, from the at least one external data source, newly relevant data with respect to the document, and retrieving the newly relevant data from the at least one external data source.

In another implementation, a system includes a memory device and a processing device coupled to the memory device. The processing device is to perform operations including receiving a plurality of natural language queries from a user, determining that each natural language query of the plurality of natural language queries is associated with a similar topic, sending a recommendation to the user to create a document having a tabular structure based on the plurality of natural language queries, and in response to receiving an indication from the user to create the document, generating the document.

In some implementations, generating the document includes identifying one or more attribute categories pertaining to the document, retrieving, from the at least one external data source, a plurality of data items corresponding to the one or more attribute categories, and generating the document by populating each cell of a plurality of cells of the document with a respective data item of the plurality of data items.

In some implementations, the at least one external data source includes at least one of: a knowledge graph or a website.

In some implementations, the operations further include retrieving one or more additional data items from the at least one external data source, and updating the document based on the one or more additional data items. In some implementations, retrieving the one or more additional data items further includes receiving an additional natural language query, and retrieving the one or more additional data items in response to receiving the additional natural language query. In some implementations, retrieving the one or more additional data items further includes identifying, from the at least one external data source, newly relevant data with respect to the personalized document, and retrieving the newly relevant data from the at least one external data source.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 is a diagram illustrating an autonomously created spreadsheet, in accordance with implementations of the disclosure.

FIG. 4 depicts a flow diagram of a method for autonomously refining a document, in accordance with implementations of the present disclosure.

FIG. 5 depicts a flow diagram of a method for autonomously creating a recommended document, in accordance with implementations of the present disclosure.

DETAILED DESCRIPTION

Figure 1:
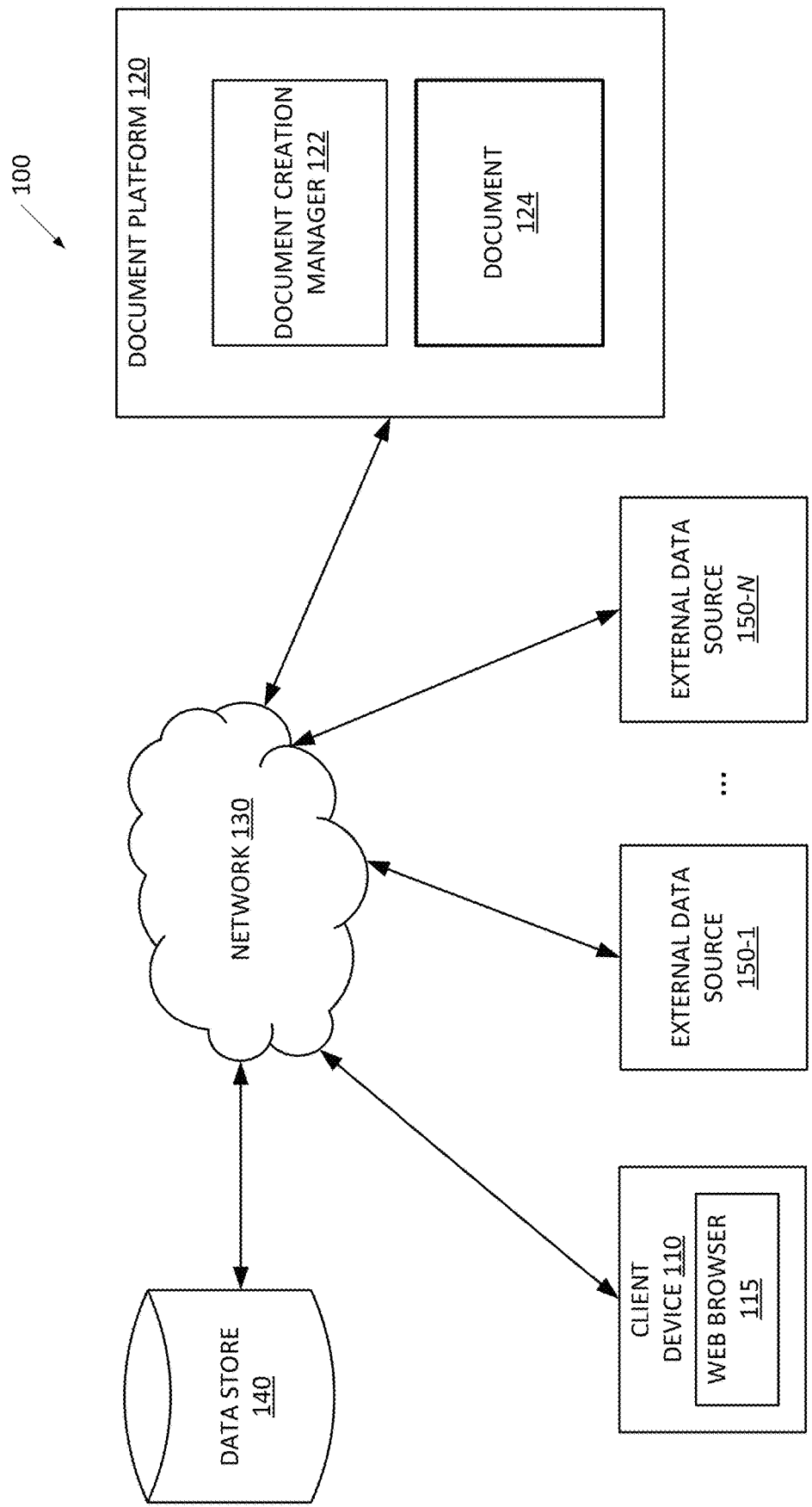
FIG. 1 illustrates an example system architecture, in accordance with implementations of the present disclosure.

Aspects of the present disclosure relate to autonomous creation of electronic documents having a tabular structure. One challenge in constructing an electronic document ("document") having a tabular structure (e.g., spreadsheet) is populating data into the document. As an illustration, the following portion of a spreadsheet including Columns A-I and Rows 1-3 is provided as Table 1:

TABLE 1

| | A | B | C | D | E | F | G | H | I |
|---|---|---|---|---|---|---|---|---|---|
| 1 | Book name | Author | Published 1$^{st}$ Edition Date | Newest Edition Date | Sales Ranking | Sales 2019 | Sales 2020 | Sales 2021 | Sales 2019-2021 |
| 2 | ABC | John Doe | | | | | | | |
| 3 | XYZ | Jane Doe | | | | | | | |

Table 1 is a portion of a spreadsheet that organizes data related to a set of books. The set of books includes "ABC" by John Doe and "XYZ" by Jane Doe, and attributes of each book of the set of books. More specifically, each cell in Column A defines the name of a book, each cell in Column B defines the author of the book defined by the cell of Column A within the same row, each cell in Column C defines the published first edition date for the book defined by the cell of Column A within the same row, each cell in Column D defines the newest edition date for the book defined by the cell of Column A within the same row, each cell in Column E defines a sales ranking for the book defined by the cell of Column A within the same row, each cell in Column F defines a number of sales in 2019 for the book defined by the cell of Column A within the same row, each cell in Column G defines a number of sales in 2020 for the book defined by the cell of Column A within the same row, each cell in Column H defines a number of sales in 2021 for the book defined by the cell of Column A within the same row, and each cell in Column I defines a number of sales from 2019 to 2021 for the book defined by the cell of Column A within the same row. The values for a cell of Column I can be derived from the corresponding values of the cells from columns F-H within the same row. For example, the value of cell I2 can be derived as a summation of the values of cell F2 through cell H2.

Columns A and B can be manually entered into the spreadsheet by a user via a computing device. Column I derives its value from Columns F-H, so the cells of Column I can be automatically populated with data once data is entered into Columns F-H. Although conventional spreadsheets enable the use of mathematical expressions to derive cell values with reference to other cell values (as described above), conventional spreadsheets typically require users to manually enter a large amount of data. Manually entering data in a spreadsheet can result in incorrect values in some of the cells due to human errors and can take significant time computing resources.

Aspects of the present disclosure address the above and other deficiencies by autonomously creating documents having a tabular structure (e.g., spreadsheets). As described herein, a document can be an entire document, or a portion of a complete document. The document can be autonomously created or generated utilizing a natural language query for retrieving data from one or more external data sources.

Natural language processing can refer to processing of natural language in order to enable interactions between humans and computing devices. For example, natural language processing techniques can be used to convert a natural language query having an unstructured natural language format that is not understandable by a computing device, into a query having a structured format that is understandable by the computing device to perform a natural language processing task. The natural language query can be a textual query, a voice query, etc. Examples of natural language processing tasks include text and speech processing, morphological analysis, syntactic analysis, lexical semantics, relational semantics, etc.

For example, upon receiving a natural language query from a user, a document creation manager of a computing system can convert the natural language query into a data access query for accessing one or more external data sources. An external data source can be an external database or repository, a knowledge graph, a website, etc. The natural language query can include a text query, a voice query, etc. For example, the natural language query can be a voice query received by a voice-controlled digital assistant.

With respect to a spreadsheet, the document creation manager can identify one or more attribute categories each defining a respective column of the spreadsheet, and a number of attributes for populating the cells within each column. Identifying the one or more attribute categories can include extracting a primary attribute category from the query, where the primary attribute category is identified as the main topic of the query. The primary attribute category can be assigned to a first column of the spreadsheet (e.g., column A). Identifying the one or more attribute categories can further include identifying one or more secondary attribute categories that are related to the primary attribute category. Each secondary attribute category can be assigned to a corresponding column within the spreadsheet, where each cell in the column is populated with a value indicative of an attribute. The one or more secondary attribute categories can be identified based on an analysis performed using an external data source (e.g., based on an analysis of connections between nodes within a knowledge graph).

The document creation manager can further refine the document after its initial creation. For example, the document creation manager can add data to a document, suggest the addition of newly relevant data into a document, automatically integrate the newly relevant data into the document, etc. Moreover, the document creation manager can suggest creating a document for a user based on a history of natural language queries received from the user. For example, if the user asks a series of questions that are similar in nature, the document creation manager can suggest creating a document that provides the answers to at least those questions. Further details regarding the operations performed by the document creation manager will be described herein below.

Automatically creating documents and automatically populating documents with data can eliminate human errors, which may result from manual entries, and reduce the time and computing resources needed to create a document and populate it with data. In addition, the automatic refinement of the document can further improve computational efficiency and reduce utilization of computing resources. For example, by integrating newly relevant data into the document, document content updates are optimized by eliminating user-conducted searches for newly relevant data and manual entries of this data into the document, which further reduces time and resource consumption.

FIG. 1 illustrates an example system architecture 100, in accordance with implementations of the present disclosure. The system architecture 100 (also referred to as "system" herein) includes at least one client device 110 that can connect to servers, such as document platform 120 (e.g., server), via a network 130. One client device 110 and one document platform 120 are illustrated as connected to network 130 for simplicity. In practice, there may be more client devices and/or document platforms. Also, in some instances, a client device may perform one or more functions of a document platform and a document platform may perform one or more functions of a client device. Client device 110 may access or receive information from document platform 120. The system architecture 100 can represent a cloud-based environment, which can enable communication between server(s) hosting document platform 120 and client devices 110 over the network 130 to store and share electronic documents. Alternatively, the system architecture 100 can apply to systems that are locally interconnected. Further, although some aspects of the disclosure are described with reference to spreadsheets and document applications managing spreadsheets, it should be understood to those skilled in the art that the systems, methods, functions, and embodiments of the present disclosure can apply to any type of electronic documents and any type of programs or services offered by any type of host applications.

In implementations, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Client device 110 can include a computing device such as personal computer (PC), laptop, mobile phone, smart phone, tablet computer, netbook computer, network-connected television, etc. The client device 110 can be associated with one or more users, and the client device 110 can also be referred to as a "user device."

In the implementation shown, document platform 120 may interact with client device 110 such that client device 110, in conjunction with document platform 120, can execute an electronic document ("document") application to manage various documents including documents having a tabular structure. For example, the document application can be an online document application. In some implementations, the document application is a spreadsheet application (e.g., online spreadsheet application). Alternatively, the document application can provide functionality described herein without the use of document platform 120. Yet alternatively, document platform 120 can interact with a web browser 115 (rather than a designated document application) to, for example, present documents, receive user input related to the documents, etc.

Documents of a user of the client device 110 may be stored by document platform 120 in, for example, data store 140. Although illustrated as a single device in FIG. 1, document platform 120 may be implemented as, for example, a single computing device or as multiple distributed computing devices. It should be understood and appreciated that whether a device is functioning as a server or a client device can depend on the specific application being implemented. That is, whether a computing device is operating as a client or a server may depend on the context of the role of the computing device within the application. The relationship of client device and server can arise by virtue of program executing on the respective devices and having a client-server relationship to each other.

As discussed above, the interaction of client device 110 with document platform 120 may be implemented through a web browser 115 executed at client device 110. The term "web browser" is intended to refer to any program that allows a user to browse markup documents (e.g., web documents), regardless of whether the browser program is a stand-alone program or an embedded program, such as a browser program included as part of an operating system. In some implementations, the document application, as described herein, is implemented as a distributed web application in which portions of the document application execute at one or more of client device 110 and at document platform 120. More specifically, the client device(s) 110 may request the document application from document platform 120. In response, document platform 120 may transmit portions of the document application for local execution at clients 110. The document application may thus execute as a distributed application across document platform 120 and one or more of the client device 110. In this manner, client device 110 may not be required to install any document application locally to use the document application hosted by the document platform 120.

In general, functions described in implementations as being performed by the document platform 120 can also be performed on the client device 110 in other implementations, if appropriate. In addition, the functionality attributed to a particular component can be performed by different or multiple components operating together. The document platform 120 can also be accessed as a service provided to other systems or devices through appropriate application programming interfaces.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the document platform 120.

A document, as described herein, may be implemented as a distributed web application in which portions of the application execute at multiple client devices 110 and at the document platform 120 to provide for collaboration among multiple users working on a single document. For example, multiple users may simultaneously or concurrently edit such a collaborative document and view the edits of each of the users in real time or near real time (e.g., within a few milliseconds or seconds). When one user edits the document (e.g., a cell of the document), the edit may be transmitted to the document platform 120 and then forwarded to other collaborating users that are also editing or viewing the spreadsheet. To this end, the document platform 120 may handle conflicts between collaborating users, such as when two users try to simultaneously edit a particular cell. For example, the document platform 120 may accept the first edit received or in some way prioritize the collaborating users such that the edits of higher priority users override those of lower priority users. If an edit of a user is rejected by the document platform 120, the document platform 120 may transmit a message back to the user that informs that user of the rejection of the edit. In this manner, multiple users may collaborate, potentially in real-time (or near real-time), on a single spreadsheet. In some implementations, the parties that view and collaborate on a particular document may be specified by an initial creator of the document. For example, the initial creator of the document may be given "administrator" privileges that allow the creator to specify the privileges for each of the other possible collaborators. The initial creator may specify that the other collaborators have privileges to do one or more of the following: edit the spreadsheet, view the spreadsheet only, edit designated parts of the spreadsheet, or add additional users to the list of possible collaborators. For example, certain users may be able to edit certain parts of the spreadsheet, while other designated cells or regions of cells will remain "locked" to those users such that the users can view but not edit the locked cells. In some implementations, a spreadsheet may be designated as a "public" spreadsheet that anyone can view and/or edit.

As further shown, the document platform 120 may include a document creation manager 122 to create documents (e.g., spreadsheets). The document creation manager 122 can, in response to receiving a natural language query from the client device 110, autonomously create or generate a document 124 based on the natural language query by populating the document 124 with data from one or more external data sources 150-1 through 150-N. The natural language query can include a text query, a voice query, etc. For example, the natural language query can be a voice query received by a voice-controlled digital assistant.

To determine how to construct the document 124, the document creation manager 122 can identify one or more attribute categories pertaining to the document 124 to be constructed. Each attribute category defines a type of attribute. For example, the one or more attribute categories can include a primary attribute category that defines a primary attribute. The one or more attribute categories can further include one or more additional or secondary attribute categories that are related to the primary attribute category and that define respective secondary attributes. The secondary attribute categories pertain to attributes related to the primary attribute category that the user may be interested in. For example, with respect to the natural language query "Create a spreadsheet of state flowers for every state in the United States", the primary attribute category can be identified based on context as "State" and a secondary attribute category can be identified based on context as "State flower".

The document creation manager 122 can further convert the natural language query into a data access query for accessing at least one of the external data sources 150-1 through 150-N. For example, the document creation manager 122 can translate the natural language query into a proper command format (e.g., SQL command format) for retrieving data from at least one of the external data sources 150-1 through 150-N. If the natural language query is a voice query (e.g., received by a voice-controlled digital assistant), the document creation manager 122 can first perform a suitable speech-to-text conversion technique to convert the speech into a text form for translation into the data access query.

In some implementations, at least one of the external data sources 150-1 through 150-N includes a knowledge graph. Generally, a knowledge graph is a graph-structured data model that provides a comprehensive collection of structured data about a network of entities (e.g. objects, events, concepts), as well as relationships between each of the entities, and attributes or properties about each of the entities. A knowledge graph can include a number of nodes that correspond to respective entities, and a number of edges that each define a relationship between a pair of nodes (entities). A knowledge graph can be embodied as an undirected graph, or directed graph that defines one-way relationships or links between the nodes. A knowledge graph can use a reasoning mechanism to derive new knowledge. As another example, the external data source can be a website. For example, for entities that are not yet in a knowledge graph, a search engine can be used to locate an external data source for the data.

Once data is obtained from the at least one of the external data sources 150-1 through 150-N, the document creation manager 122 can create the document 124. For example, if the document 124 includes a spreadsheet, the spreadsheet can be created to include one or more columns each assigned to a respective attribute category, where a row of the spreadsheet can include one or more cells that are each populated with a respective value indicative of an attribute corresponding to the attribute category. The primary attribute category can be assigned to a first column of the spreadsheet (e.g., column A), while each secondary attribute category (if any exist) can be assigned to a corresponding additional column in the spreadsheet. Each cell in the first row (e.g., row 1) can be populated with a name of the attribute category of its corresponding column, while each cell in a subsequent row can be populated with a respective value for the attribute category. After the document 124 has been created, a user via the client device 110 can modify the presentation of the document 124. For example, if the document 124 is a spreadsheet, the user can rearrange or manipulate the data using any suitable spreadsheet tool. An example of this spreadsheet will be described in further detail below with reference to FIG. 2.

Each of the secondary attribute categories can be selected based on a historical analysis of prior natural language queries or search history to identify the most popular attribute categories related to the primary attribute category. For example, the document creation manager 122 can identify information related to the primary attribute category that other users have asked about in the past to determine what information may be of interest to the current user. This can be used to create the document 124 to include information that, although not directly requested by the user, may be of interest to the user based on search history.

Illustratively, with respect to the natural language query "Create a spreadsheet of the winningest college basketball coaches of all time", the document creation manager 122 can identify "Wins" as at least one popular attribute category related to the primary attribute category "Coaches". Additionally, the document creation manager 122 can identify "Win percentage" as another popular attribute category that can be included in the document 124. This may be because other users have previously provided a natural language query such as "Which college basketball coach has the highest winning percentage?" and thus the document creation manager 122 has decided that this information, although not specifically requested, may be of interest to the current user.

The document creation manager 122 can provide one or more additional features. In some implementations, the document creation manager 122 can further provide access back to an external data source (e.g., a link to the external data source). This can enable a user to explore more details of the data that has been populated into the document 124, and provide a way for the user to validate data trust. For example, if the user is concerned about the accuracy of the data from the external data source, the user could access (e.g., via the provided link) the external data source itself to determine whether to trust the veracity of the data.

In some implementations, the document creation manager 122 can further implement a data confidence feature. For example, the data confidence feature can be related to the confidence that the data obtained from a particular source is an accurate response to a particular natural language query. The data confidence feature can utilize a visual confidence indicator for data, such as a confidence percentage, a symbol (e.g., color) corresponding to a confidence range (e.g., green circle for greater than 90% confidence, red circle for less than 50% confidence), etc. A user can set a customizable confidence threshold that should be exceeded in order to populate the corresponding cell with the data. For example, for some natural language queries, a user may want to ensure that only high-confidence data is used (e.g., setting the confidence threshold for 90% confidence), while for some other natural language queries, a user may have greater tolerance for low-confidence data (e.g., not setting a confidence threshold).

In some implementations, the document creation manager 122 can further identify an intent of a natural language query to leverage unstructured data sources and/or structured data sources. For example, with respect to a spreadsheet, the document creation manager 122 can combine a column category along with one or more attributes of the spreadsheet to identify the intent of the natural language query.

In some implementations, the document creation manager 122 can handle multi-dimensional data. For example, assume that a document 124 is a spreadsheet that includes a list of cities in the United States. One of the columns of the spreadsheet can be "Population," and a user may be interested in viewing graphs and calculations built based on populations in a number of cities. Each cell in the "Population" column can be a single-dimensional value (e.g., latest population) or a multi-dimensional value (e.g., an array of population over time, such as the population from each census measurement). Since the data is populated programmatically into respective cells, the document creation manager 122 can retrieve time series population data for graphing and/or calculations.

In some implementations, the document creation manager 122 can identify data types for data retrieved in response to a natural language query. For example, data can have a particular data type, such as GPS coordinate, date, single integer value, array of integer values, etc. The document creation manager 122 can maintain metadata about the data type that can be used to aid in data manipulation (e.g., creations of graphs, calculations).

In some implementations, the document creation manager 122 can provide for document refinement. Document refinement can enable a user to augment the document 124 using an additional natural language query. In the case of a spreadsheet autonomously created by the document creation manager 122, document refinement can be used to augment columns of the spreadsheet. For example, with respect to the spreadsheet of state flowers described above, if a user would like to add state birds to the spreadsheet, the user can provide an additional natural language query to insert a column of state bird information (e.g., "Add state birds to the spreadsheet").

In some implementations, the document creation manager 122 can incorporate trend or virality features to select attributes to populate the document 124. For example, the document creation manager 122 can identify, with an external data source, newly relevant data with respect to a document 124, and populate the document 124 with the newly relevant data as attributes. Additionally, the document creation manager 122 can detect newly relevant data, and provide the user with a suggestion to incorporate the newly relevant data within the document 124.

In some implementations, the document creation manager 122 can recommend or suggest the creation of the document 124 based on one or more natural language queries. The recommendation can be made based on an analysis of user questioning behavior. For example, assume that a user provides the natural language query "What is the state flower of Texas?" The user then follows up with two similar natural language queries asking for state flowers of two other states of the United States. The document creation manager 122 can provide the user with a suggestion to generate a document that includes information about the state flower for every state of the United States. If the user accepts, then the data management manager 122 can construct the document 124 for the user, even though the user did not directly request the creation of the document 124.

With autonomous document creation, the document 124 can theoretically have a large amount of data (e.g., a large number of columns and/or rows in a spreadsheet). This can lead to increased consumption of resources, increased cost for acquiring data, etc. To address this, in some implementations, the document creation manager 122 can enable configurable size limits with respect to the size of the document 124. For example, the document creation manager 122 can adjust a size of the document 124 based on user input defining how many rows and/or columns that document 124 should include. As another example, the document creation manager 122 can detect that the document 124 will have a large volume of data (e.g., an amount of data exceeding a threshold amount of data), and notify a user of the large volume of data. The notification can include a request for the user to define how much data to include in the document 124. Additionally or alternatively, the maximum size of the document 124 can be a user-defined setting or threshold. Accordingly, the document creation manager 122 can implement functionality to improve computational resource efficiency.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 2 is a diagram illustrating an example spreadsheet 200, in accordance with implementations of the present disclosure. It is assumed that the spreadsheet 200 has been generated using a document creation manager (e.g., the document creation manager 122 of FIG. 1) in response to the natural language query "Create a spreadsheet of the winningest college basketball coaches of all time". Although a spreadsheet is shown in FIG. 2, such an example should not be considered limiting, and any suitable document having a tabular structure is contemplated.

As shown, the spreadsheet 200 includes a number of columns 210A through 210E and a number of rows 220-1 through 220-4. Although 5 columns and 4 rows are shown, the number of columns and rows should not be considered limiting. Row 220-1 is a descriptive row that indicates the type of data to be inserted within the cells of a corresponding column.

The column 210A is assigned to the primary attribute category "Coach". The text "Coach" is entered into the cell having an address defined by row 220-1 and column 210A to indicate that the data maintained in the other cells of column 210A correspond to names of coaches (e.g., the respective cells having addresses defined by column 210A and rows 220-2 through 220-4). For example, the cell having an address defined by row 220-2 and column 210A is filled with the coach name "John Doe" and the cell having an address defined by row 220-3 and column 210A is filled with the coach name "Jane Smith." Accordingly, column 210A is defined as a "Coach" column and includes a number of cells having values indicative of respective coach names.

The column 210B is assigned to the secondary attribute category "Wins". The text "Wins" is entered into the cell having an address defined by row 220-1 and column 210B to indicate that the data maintained in the other cells of column 210B correspond to the number of wins of respective ones of the coaches (e.g., the respective cells having addresses defined by column 210B and rows 220-2 through 220-4). For example, the cell having an address defined by row 220-2 and column 210B is filled with the value "1132" to indicate that John Doe has a total of 1132 wins and the cell having an address defined by row 220-3 and column 210B is filled with the value "946" to indicate that Jane Smith has a total of 946 wins. Accordingly, column 210B is defined as a "Wins" column and includes a number of cells having values indicative of wins for respective ones of the coaches listed in column 210A.

The column 210C is assigned to the secondary attribute category "Losses". The text "Losses" is entered into the cell having an address defined by row 220-1 and column 210C to indicate that the data maintained in the other cells of column 210C correspond to a number of losses of respective ones of the coaches (e.g., the respective cells having addresses defined by column 210C and rows 220-2 through 220-4). For example, the cell having an address defined by row 220-2 and column 210C is filled with the value "344" to indicate that John Doe has a total of 344 losses and the cell having an address defined by row 220-3 and column 210C is filled with the value "385" to indicate that Jane Smith has a total of 385 losses. Accordingly, column 210C is defined as a "Losses" column and includes a number of cells having values indicative of wins for respective ones of the coaches listed in column 210A.

The column 210D is assigned to the secondary attribute category "Win Percentage". The text "Win Percentage" is entered into the cell having an address defined by row 220-1 and column 210D to indicate that the data maintained in the other cells of column 210D correspond to the win percentage of respective ones of the coaches (e.g., the respective cells having addresses defined by column 210D and rows 220-2 through 220-4). For example, the cell having an address defined by row 220-2 and column 210D is filled with the value "76.7" to indicate that John Doe has a 76.7 win percentage and the cell having an address defined by row 220-3 and column 210D is filled with the value "71.71" to indicate that Jane Smith has 71.1 win percentage. Accordingly, column 210D is defined as a "Win percentage" column and includes a number of cells having values indicative of win percentage for respective ones of the coaches listed in column 210A.

The column 210E is assigned to the secondary attribute category "Seasons". The text "Seasons" is entered into the cell having an address defined by row 220-1 and column 210E to indicate that the data maintained in the other cells of column 210E correspond to the number of seasons that respective ones of the coaches have coached for (e.g., the respective cells having addresses defined by column 210E and rows 220-2 through 220-4). For example, the cell having an address defined by row 220-2 and column 210E is filled with the value "44" to indicate that John Doe has coached for 44 seasons and the cell having an address defined by row 220-3 and column 210D is filled with the value "43" to indicate that Jane Smith has coached for 43 seasons. Accordingly, column 210E is defined as a "Seasons" column and includes a number of cells having values indicative of number of seasons coached by respective ones of the coaches listed in column 210A.

Additional data can be appended to the spreadsheet 200 upon request. For example, to add information regarding the date of birth for each coach, a user can provide a suitable natural language query (e.g., "Add the date of birth for each coach to the spreadsheet"). In response to receiving the query, a "Date of birth" column can be added to the spreadsheet 200 that indicates the date of birth for each of the coaches listed in column 210A currently coaches for.

Figure 3:
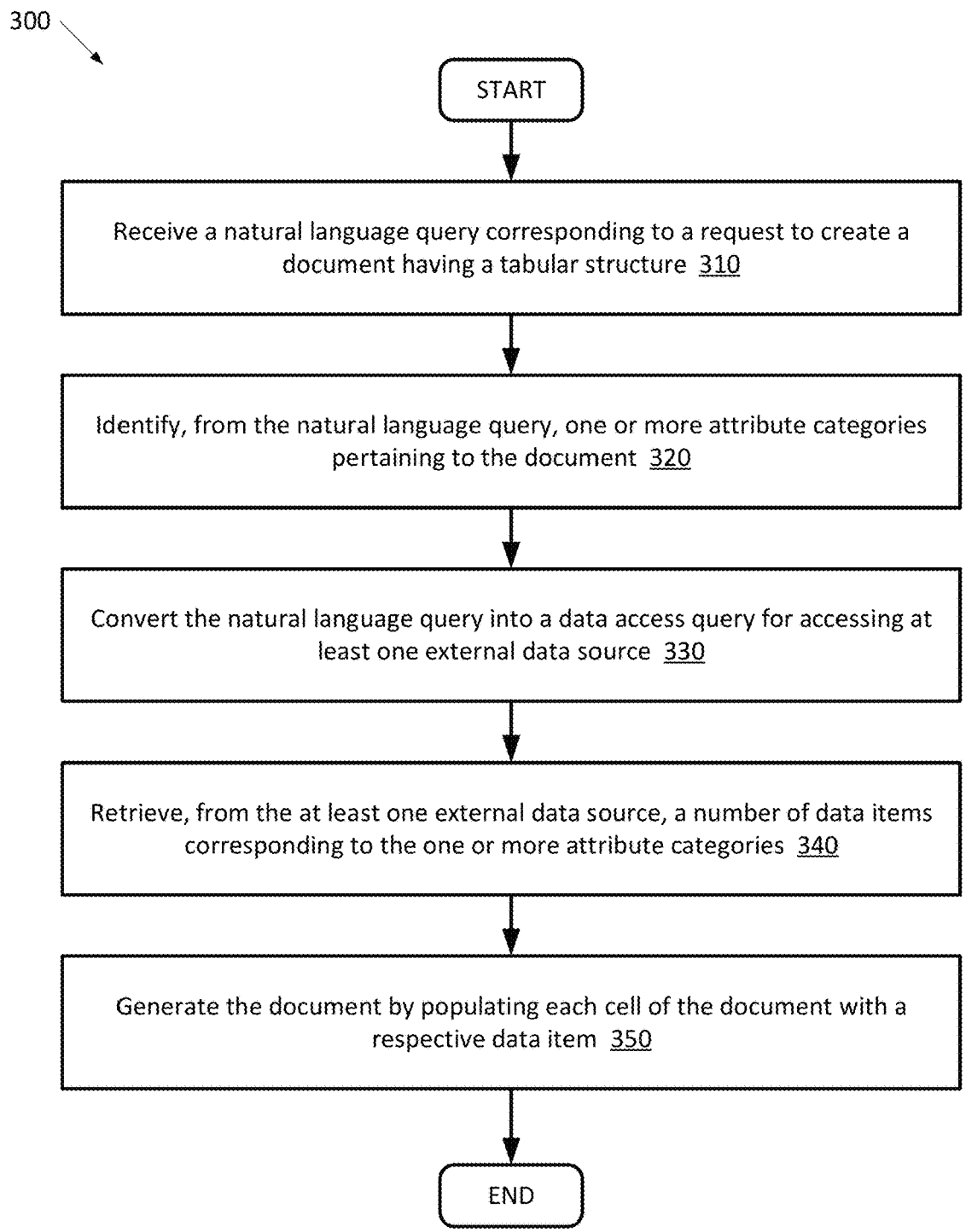
FIG. 3 depicts a flow diagram of a method for autonomous document creation, in accordance with implementations of the present disclosure.

FIG. 3 depicts a flow diagram of a method 300 for autonomous document creation, in accordance with implementations of the present disclosure. Method 300 may be performed by processing logic that may include hardware (circuitry, dedicated logic, etc.), software (e.g., instructions run on a processing device), or a combination thereof. In one implementation, some or all the operations of method 300 may be performed by the document creation manager 122 of FIG. 1.

At block 310, the processing logic receives a natural language query corresponding to a request to create a document having a tabular structure. In some implementations, the document is a spreadsheet including a number of columns of cells and a number of rows of cells. The natural language query can include at least one of a text natural language query received from a user via a GUI, a voice natural language query received from a user (e.g., via a voice-controlled digital assistant), etc.

At block 320, the processing logic identifies, from the natural language query, one or more attribute categories pertaining to the document. Each attribute category corresponds to a type of attribute, and each cell of the document can be populated with data indicative of the attribute. In some implementations, the one or more attribute categories include a primary attribute category and one or more secondary attribute categories. The primary attribute category and the one or more secondary attribute categories can be identified based on a semantic analysis of the natural language query using any suitable natural language processing technique.

At block 330, the processing logic converts the natural language query into a data access query for accessing at least one external data source. For example, the processing logic can translate the natural language query into a proper command format (e.g., SQL command format) for retrieving data from the at least one external data source. If the natural language query is a voice query (e.g., received by a voice-controlled digital assistant), the document 122 can first perform a suitable speech-to-text conversion technique to convert the speech into a text form for translation into the data access query. In some implementations, the at least one external data source includes a knowledge graph. The query conversion can be performed using a query conversion mechanism that provides capabilities related to semantic representations, language understanding and question-answering. These capabilities can be leveraged to understand an intent of the natural language query for translation into the data access query used to search for data within the at least one external data source. Additionally, the query conversion mechanism can refine its ability to understand the intent of the natural language query based on results of prior natural language query conversions and/or searches (e.g., prior web search queries, search results and user selections of relevant search results).

At block 340, the processing logic retrieves, from the at least one external data source, a number of data items corresponding to the one or more attribute categories and, at block 350, generates the document by populating each cell of the document with a respective data item. For example, if the document is a spreadsheet, a first column of the spreadsheet can be assigned to the primary attribute category, where a first cell of the first column is populated with an identifier of the primary attribute category, and other cells of the first column are populated with values corresponding to the data items pertaining to the primary attribute category. A second column of the spreadsheet can be assigned to one of the secondary attribute categories, where a first cell of the second column is populated with an identifier of the secondary attribute category, and other cells of the second column are populated with values corresponding to the data items pertaining to the secondary attribute category. The value of a cell of the second column pertains to the value of the cell in the first column within the same row.

For example, the at least one external data source can include a primary data source, such as a knowledge graph. However, it may be the case that the primary data source does not yet include particular information for satisfying the query. For example, if the document being generated includes data items regarding local restaurants, the opening hours for at least one restaurant included in the document may not currently exist in the primary data source (e.g., knowledge graph). In such cases, the at least one external data source can further include a secondary data source that supplements the particular information missing from the primary data source. For example, the secondary data source can be a website, which can be identified by utilizing the query within a search engine.

In some implementations, the document can be generated in accordance with a configurable size limit. For example, the user can provide hints regarding how large to make the document (e.g., how many rows and/or columns of a spreadsheet). As another example, the processing logic can detect that a document will have a large volume of data (e.g., an amount of data exceeding a threshold amount of data), and notify a user of the large volume of data. The notification can include a request for the user to define how much data to include in the document. Additionally or alternatively, the maximum size of the document can be a user-defined setting or threshold. Further details regarding blocks 310-340 are described above with reference to FIGS. 1-2.

FIG. 4 depicts a flow diagram of a method 400 for autonomously refining a document, in accordance with implementations of the present disclosure. Method 400 may be performed by processing logic that may include hardware (circuitry, dedicated logic, etc.), software (e.g., instructions run on a processing device), or a combination thereof. In one implementation, some or all the operations of method 400 may be performed by the document creation manager 122 of FIG. 1.

At block 410, the processing logic retrieves one or more additional data items from at least one external data source for integration into a document having a tabular structure. For example, the document can be a spreadsheet including a number of columns of cells and a number of rows of cells. It is assumed that the document has been created prior to receiving the natural language query. In some implementations, the document was autonomously created, such as in accordance with the method described above with reference to FIG. 3. In some implementations, at least a portion of the document was manually created by a user.

In some implementations, the one or more additional data items are retrieved in response to receiving an additional natural language query. The additional natural language query can include at least one of a text natural language query received from a user via a GUI, a voice natural language query received from a user (e.g., via a voice-controlled digital assistant), etc. For example, the processing logic can identify, from the additional natural language query, one or more secondary attribute categories pertaining to the document, convert the additional natural language query into a data access query for accessing at least one external data source, and retrieve the one or more additional data items from the at least one external data source corresponding to the one or more secondary attribute categories, similar to the process described above with reference to blocks 320 through 340 of FIG. 3.

In some implementations, the one or more additional data items are identified, from the at least one external data source, as newly relevant data with respect to the document.

For example, the newly relevant data can include trending or viral information that is currently not present within the document.

At block 420, the processing logic updates the document based on the one or more additional data items. Updating the document can include updating one or more attributes of one or more existing cells of the document based on the one or more additional data items, adding one or more cells populated with one or more attributes based on the newly relevant data, etc.

For example, if the document includes a spreadsheet, updating the document can include appending one or more additional columns to the document, and populating one or more cells of the one or more additional columns with one or more respective attributes each corresponding to a particular additional data item.

In some implementations, the one or more attribute categories are each additional secondary attribute categories with respect to a primary attribute category of the document. For example, if the document includes a spreadsheet, the primary attribute category can be assigned to a first column of the spreadsheet. An addition column of the spreadsheet can be assigned to one of the additional secondary attribute categories, where a first cell of the additional column is populated with an identifier of the additional secondary attribute category, and other cells of the additional column are populated with values corresponding to the data items pertaining to the additional secondary attribute category. The value of a cell of the additional column pertains to the value of the cell in the first column within the same row. Further details regarding blocks 410 and 420 are described above with reference to FIGS. 1-3.

FIG. 5 depicts a flow diagram of a method 500 for autonomously creating a recommended document, in accordance with implementations of the present disclosure. Method 500 may be performed by processing logic that may include hardware (circuitry, dedicated logic, etc.), software (e.g., instructions run on a processing device), or a combination thereof. In one implementation, some or all the operations of method 500 may be performed by the document creation manager 122 of FIG. 1.

At block 510, the processing logic receives a number of natural language queries from a user. For example, the natural language queries can include at least a first natural language query and a second natural language query. Each natural language query can include at least one of a text natural language query received from a user via a GUI, a voice natural language query received from a user (e.g., via a voice-controlled digital assistant), etc.

At block 520, the processing logic determines that the natural language queries are associated with a similar topic. Determining that the natural language queries are associated with a similar topic can include identifying that at least the first and second natural language queries relate to a similar request for information. For example, the first natural language query can be "What is the state flower of Texas?" and the second natural language query can be "What is the state flower of New York?"

At block 530, the processing logic sends a recommendation to the user to create a document having a tabular structure based on the natural language queries. For example, if the first natural language query is "What is the state flower of Texas?" and the second natural language query is "What is the state flower of New York?", the processing logic can generate a suggestion to create a document that includes information about the state flower for every state of the United States.

At block 540, the processing logic receives, from the user, an indication to create the document. If the processing logic did not receive an indication from the user to create the document (e.g., the user provides a negative response to the recommendation), then the processing logic does not create the document and the process ends.

At block 550, the processing logic generates the document. The document can be generated in a manner similar to that described above with reference to FIG. 3. For example, the processing logic can retrieve data items from at least one external data source corresponding to attribute categories identified from the natural language queries, and populating each cell of the document with a respective data item. Further details regarding blocks 510-550 are described above with reference to FIGS. 1-4.

Figure 6:
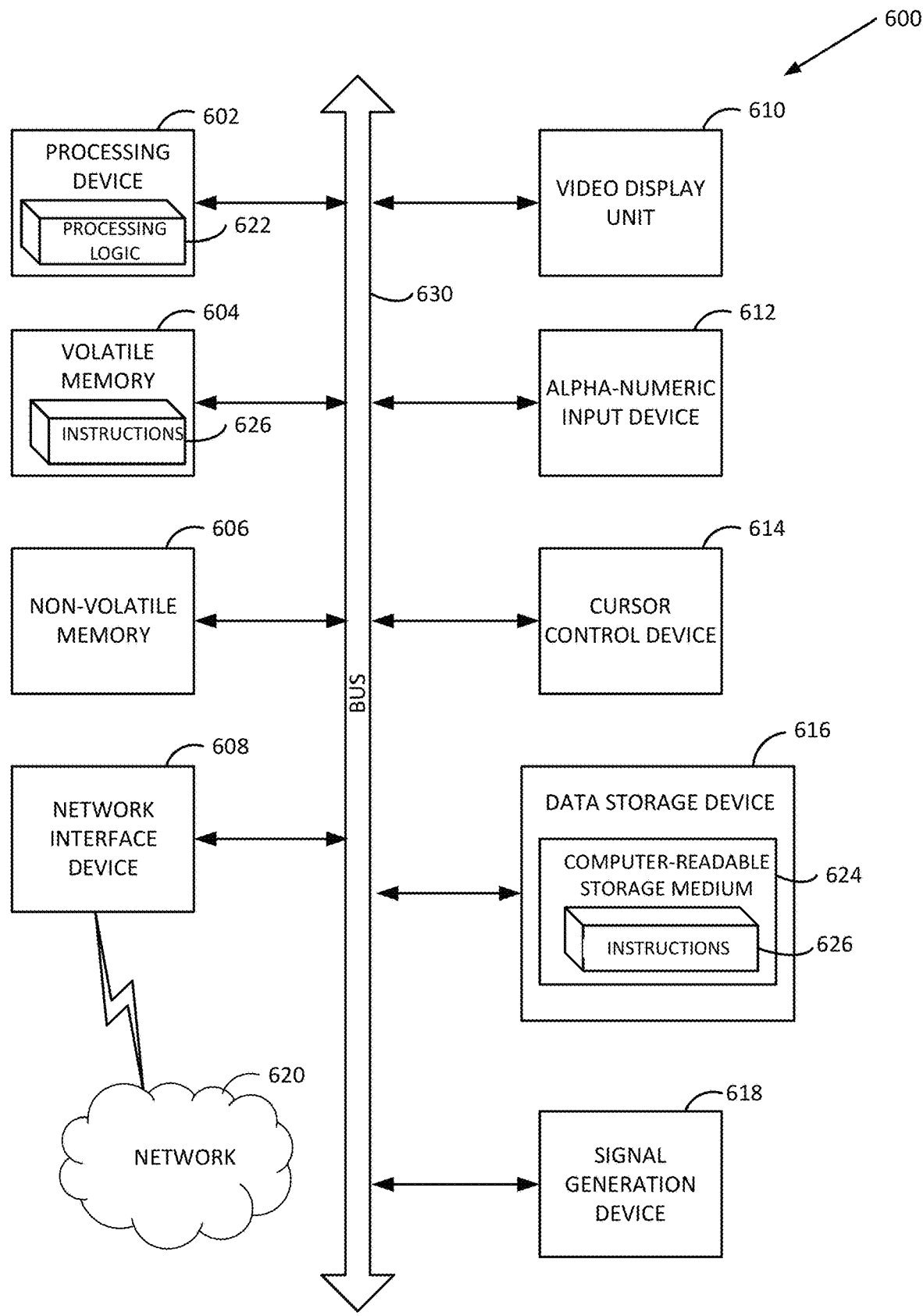
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the document platform 120 or the client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for obtaining optimized encoder parameter settings) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for designating a verbal statement as a polling question. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

receiving, by a processing device, a natural language query corresponding to a request to populate a document having a tabular structure;

identifying, by the processing device, a set of attribute categories pertaining to the document, the set of attribute categories comprising a first attribute category corresponding to one or more cells populated with one or more first attributes;

converting, by the processing device, the natural language query into a semantic index representation for accessing at least one external data source comprising a knowledge graph;

retrieving, by the processing device from the at least one external data source, a plurality of data items corresponding to the set of attribute categories; and populating, by the processing device, each cell of a plurality of cells of the document with a respective data item of the plurality of data items.

2. The method of claim 1, wherein the at least one external data source further comprises a website.

3. The method of claim 1, wherein populating the document comprises generating an original version of the document to have a size determined in accordance with a size limit.

4. The method of claim 1, further comprising:
retrieving, by the processing device, one or more additional data items from the at least one external data source; and
updating, by the processing device, the document based on the one or more additional data items.

5. The method of claim 4, wherein retrieving the one or more additional data items further comprises:
receiving an additional natural language query; and
retrieving the one or more additional data items in response to receiving the additional natural language query.

6. The method of claim 4, wherein retrieving the one or more additional data items further comprises:
identifying, from the at least one external data source, newly relevant data with respect to the document; and
retrieving the newly relevant data from the at least one external data source.

7. A system comprising:
a memory device; and
a processing device coupled to the memory device, the processing device to perform operations comprising:
receiving a natural language query corresponding to a request to populate a document having a tabular structure;
identifying a set of attribute categories pertaining to the document, the set of attribute categories comprising a first attribute category corresponding to one or more cells populated with one or more first attributes;
converting the natural language query into a semantic index representation for accessing at least one external data source comprising a knowledge graph;
retrieving, from the at least one external data source, a plurality of data items corresponding to the set of attribute categories; and
populating each cell of a plurality of cells of the document with a respective data item of the plurality of data items.

8. The system of claim 7, wherein the at least one external data source further comprises a website.

9. The system of claim 7, wherein populating the document comprises generating an original version of the document to have a size determined in accordance with a size limit.

10. The system of claim 7, wherein the operations further comprise:
retrieving one or more additional data items from the at least one external data source; and
updating the document based on the one or more additional data items.

11. The system of claim 10, wherein retrieving the one or more additional data items further comprises:
receiving an additional natural language query; and
retrieving the one or more additional data items in response to receiving the additional natural language query.

12. The system of claim 10, wherein retrieving the one or more additional data items further comprises:
identifying, from the at least one external data source, newly relevant data with respect to the document; and
retrieving the newly relevant data from the at least one external data source.

13. A system comprising:
a memory device; and
a processing device coupled to the memory device, the processing device to perform operations comprising:
receiving a plurality of natural language queries from a user;
determining that each natural language query of the plurality of natural language queries is associated with a similar topic;
sending a recommendation to the user to populate a document having a tabular structure based on the plurality of natural language queries; and
in response to receiving an indication from the user to populate the document, populating each cell of a plurality of cells of the document with a respective data item of a set of data items retrieved from at least one external data source comprising a knowledge graph and a semantic index, wherein the set of data items corresponds to a set of attribute categories pertaining to the document, and wherein the set of attribute categories comprises a first attribute category corresponding to one or more cells populated with one or more first attributes.

14. The system of claim 13, wherein populating the document comprises generating an original version of the document to have a size determined in accordance with a size limit.

15. The system of claim 13, wherein populating the document comprises converting the natural language query into a semantic index representation for accessing the at least one external data source using the semantic index.

16. The system of claim 13, wherein populating the document further comprises:
identifying the set of attribute categories pertaining to the document; and
retrieving, from the at least one external data source, the set of data items.

17. The system of claim 13, wherein the at least one external data source further comprises a website.

18. The system of claim 13, wherein the operations further comprise:
retrieving one or more additional data items from the at least one external data source; and
updating the document based on the one or more additional data items.

19. The system of claim 18, wherein retrieving the one or more additional data items further comprises:
receiving an additional natural language query; and
retrieving the one or more additional data items in response to receiving the additional natural language query.

20. The system of claim 18, wherein retrieving the one or more additional data items further comprises:
identifying, from the at least one external data source, newly relevant data with respect to the document; and
retrieving the newly relevant data from the at least one external data source.

* * * * *